United States Patent [19]

Milde

[11] Patent Number: 5,392,200
[45] Date of Patent: Feb. 21, 1995

[54] CIRCUIT FOR PROVIDING ILLUMINATION ON A MOTOR VEHICLE WHEEL

[76] Inventor: Marcus K. Milde, 61-15 251st St., Little Neck, N.Y. 11362-2435

[21] Appl. No.: 201,561

[22] Filed: Feb. 25, 1994

Related U.S. Application Data

[63] Continuation-in-part of Ser. No. 9,022, Jan. 26, 1993.

[51] Int. Cl.[6] ............................................. B60Q 1/00
[52] U.S. Cl. ................................... 362/78; 362/35; 362/184; 362/251; 362/276; 362/394; 362/800; 362/802
[58] Field of Search ................ 362/35, 78, 190, 191, 362/184, 252, 251, 269, 271, 276, 800, 802, 806, 394; 200/52 R, 61.39, 61.45 R, 61.46, 61.47, 61.49, 80 A, 80 B, 80 R; 446/47, 242, 438, 439

[56] References Cited

U.S. PATENT DOCUMENTS

| | | | |
|---|---|---|---|
| 2,903,820 | 9/1959 | Bodell | 362/802 |
| 3,580,575 | 5/1971 | Spaeth | 362/802 |
| 3,935,669 | 2/1976 | Potrzuski et al. | 200/61.45 R |
| 4,562,516 | 12/1985 | Chastain | 362/78 |
| 5,016,144 | 5/1991 | DiMaggio | 362/35 |
| 5,128,840 | 7/1992 | Seki et al. | 362/78 |
| 5,294,188 | 3/1994 | Vancil, Jr. | 362/78 |

Primary Examiner—Stephen F. Husar
Assistant Examiner—Alan B. Cariaso
Attorney, Agent, or Firm—Karl F. Milde, Jr.

[57] ABSTRACT

A circuit for providing illumination on a wheel hub cap comprises a plurality of electric lights, adapted to be arranged on the hub cap; an electric battery, adapted to be arranged on the hub cap; and at least one inertial switch connected electrically in series between the battery and the electric lights and adapted to be arranged on the hub cap in spaced relationship to the central axis of the hub cap and with such orientation as to be closed by centrifugal force upon rotation of the hub cap.

18 Claims, 5 Drawing Sheets

CIRCUIT FOR PROVIDING ILLUMINATION ON A MOTOR VEHICLE WHEEL

CROSS-REFERENCE TO RELATED APPLICATION

This application is a continuation-in-part of U.S. patent application Ser. No. 08/009,022, filed Jan. 26, 1993 by Marcus K. Milde.

BACKGROUND OF THE INVENTION

The present invention relates generally to illuminating a motor vehicle wheel hub cap and, more particularly, to a battery powered circuit which automatically switches on hub cap lights upon rotation of motor vehicle wheel.

Many circuits and systems are known for providing illumination on the wheels of a motor vehicle. Such known circuits have included a built-in generator, as is disclosed for example in the U.S. Pat. No. 3,340,389. Other lighting circuits have been powered by the motor vehicle battery, as is disclosed for example in the U.S. Pat. No. 3,113,727.

The U.S. Pat. No. 3,935,669 discloses an arrangement of two switches connected in series (FIGS. 3 and 4) or four switches connected in series and parallel (FIG. 9). Both of these arrangements have an ambiguous position—namely, the position in which the two switches are arranged on the same horizontal plane. It is possible in this case to have both switches in the "on" position so that the lights remain on, even while the wheel is stationary.

The U.S. Pat. No. 4,562,516 discloses a car wheel "spinner" having a battery, lights and a manual switch. There is provision for inertial switches to automatically turn the lights off when the wheel is not moving.

A light for a bicycle wheel is known which employs a dry cell battery arranged in such a manner as to close the electrical circuit, and thereby switch on the light, when the wheel is turning. This lighting arrangement, which is actuated by centrifugal force, is disclosed in the U.S. Pat. No. 4,176,390.

All of these prior known circuits and systems are relatively complex mechanically, and therefore expensive to manufacture.

SUMMARY OF THE INVENTION

It is a principal object of the present invention to provide circuit apparatus for illuminating a rotatable motor vehicle wheel hub cap, which apparatus is extremely simple and inexpensive to manufacture.

It is a further object of the present invention to provide circuit apparatus that illuminates a motor vehicle wheel hub cap only when the wheel is turning.

It is still a further object of the present invention to provide a battery-powered lighting circuit for a vehicle wheel hub cap, in which the battery is mounted on the hub cap.

It is a still further object of the present invention to provide circuit apparatus for a motor vehicle wheel hub cap, which apparatus incorporates a mercury switch that is subject to centrifugal forces of the vehicle wheel.

These objects, as well as further objects which will become apparent from the discussion that follows, are achieved, in accordance with the present invention, by an electric lighting circuit comprising a plurality of electric lights adapted to be arranged on the vehicle wheel hub cap; an electric battery adapted to be arranged on the hub cap; and at least one inertial switch connected electrically in series between the battery and the electric lights. The inertial switch is arranged on the hub cap in spaced relationship to the central axis of the hub cap and with such an orientation as to be closed by centrifugal force upon rotation of the wheel.

In a first preferred embodiment of the invention three inertial switches each include a switching element formed of a movable (e.g. liquid) conductor such as mercury. By arranging the three switches symmetrically in the circumferential direction about the axis of the hub cap, at least one switch will always be open when the wheel is not turning. Only when the movable conductors of all the switches are subjected to centrifugal forces will all of the switches be simultaneously closed, thus closing the circuit to the electric lights.

In a second preferred embodiment of the present invention a single inertial switch is provided which remains in the "off" position until the hub cap rotates at a prescribed minimum speed. When this speed is reached the centrifugal force causes this switch to close.

Advantageously, a control device is also provided so that the entire circuit may be switched on or off, as desired. For example, a photocell-controlled switch may be connected in series with the battery and lights to automatically switch off the circuit during daylight hours. Alternatively, or in addition, a manual or remote-controlled switch may be connected in the series circuit to permit the vehicle operator to switch the power on or off.

For a detailed understanding of the present invention, reference should now be made to the accompanying drawings and to the following description thereof.

DESCRIPTION OF THE PREFERRED EMBODIMENTS

Figure 1:
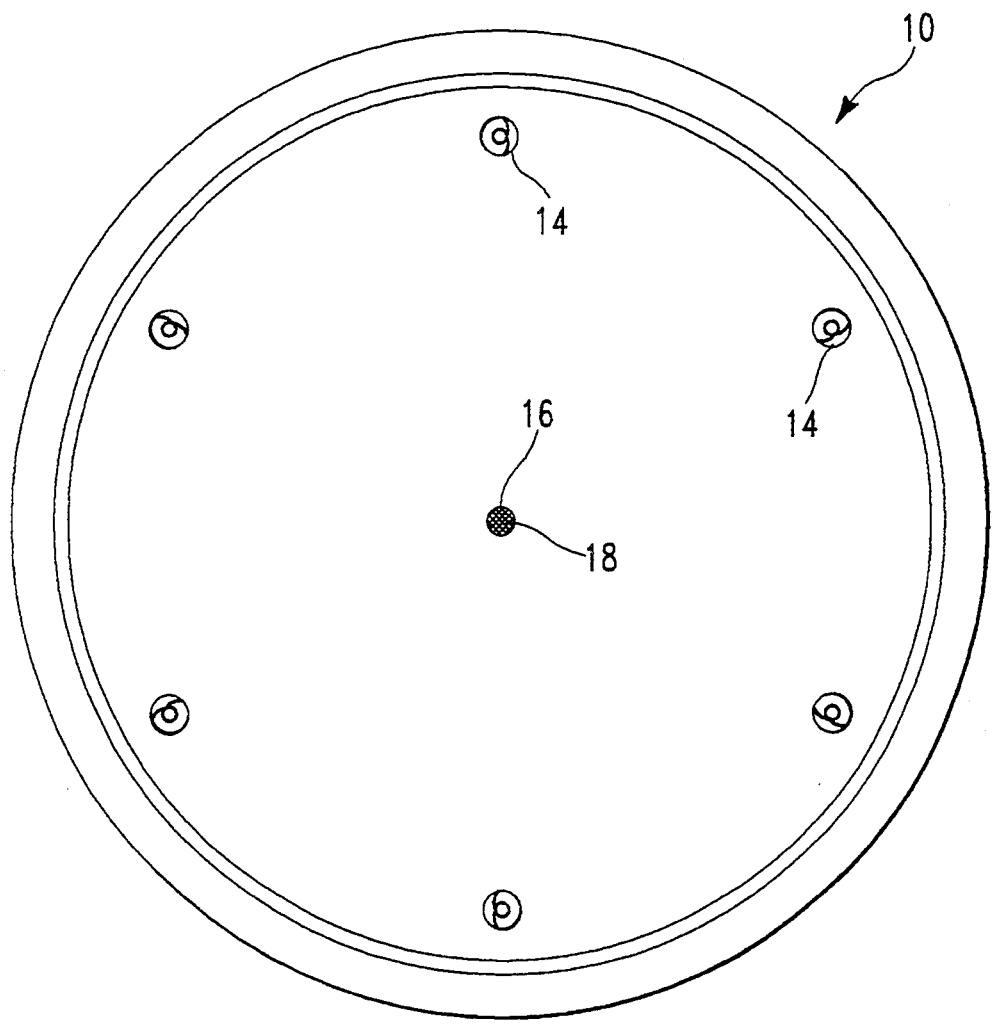
FIG. 1 is a side elevational view of a motor vehicle wheel hub cap with electric lights mounted therein in accordance with a preferred embodiment of the present invention.

The preferred embodiments and the best mode for practicing the present invention will now be described with reference to FIGS. 1-8 of the drawings. Identical elements in the various figures have been assigned the same reference numerals.

Figure 2:
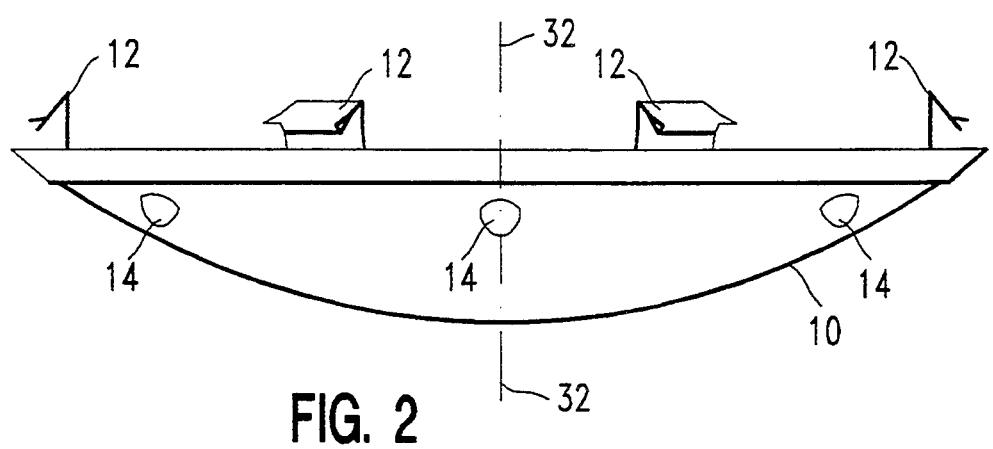
FIG. 2 is an end elevational view of the hub cap shown in FIG. 1.
Figure 3:
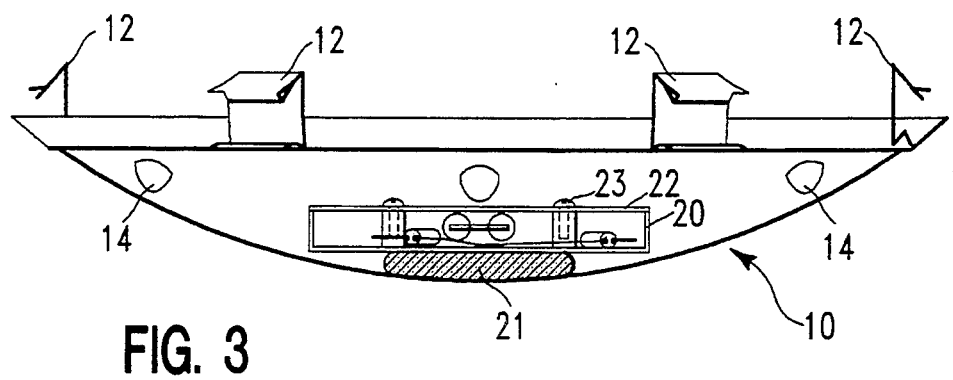
FIG. 3 is an end elevational view of the hub cap of FIGS. 1 and 2 shown in partial cutaway section to reveal the electrical circuit that powers and controls the lights.

FIGS. 1 and 2 illustrate a motor vehicle hub cap 10 having a plurality of hooks 12 designed to hold the hub cap on a wheel rim (not shown). The hub cap 10 is also provided with a plurality of (e.g. five) electric lights 14, with each light preferably at substantially the same radial distance from the central rotational axis. As may be seen, the lights are substantially equally spaced around the hub cap in the circumferential direction.

Arranged at the center of rotation of the hub cap is an opening 16 containing a protective screen 18. This opening permits daylight (or an infrared beam, or the like) to enter and reach the control device that switches the light circuit on and off.

The power and control portion of the electric circuit, which includes a plurality of switches and at least one battery, is housed within an enclosure 20 immediately behind the center portion of the hub cap. This enclosure may be affixed to the curved inner surface of the hub cap with silicone glue 21, or the like. The enclosure is provided with a removable cover 22 that is retained by screws 23.

Figure 4:
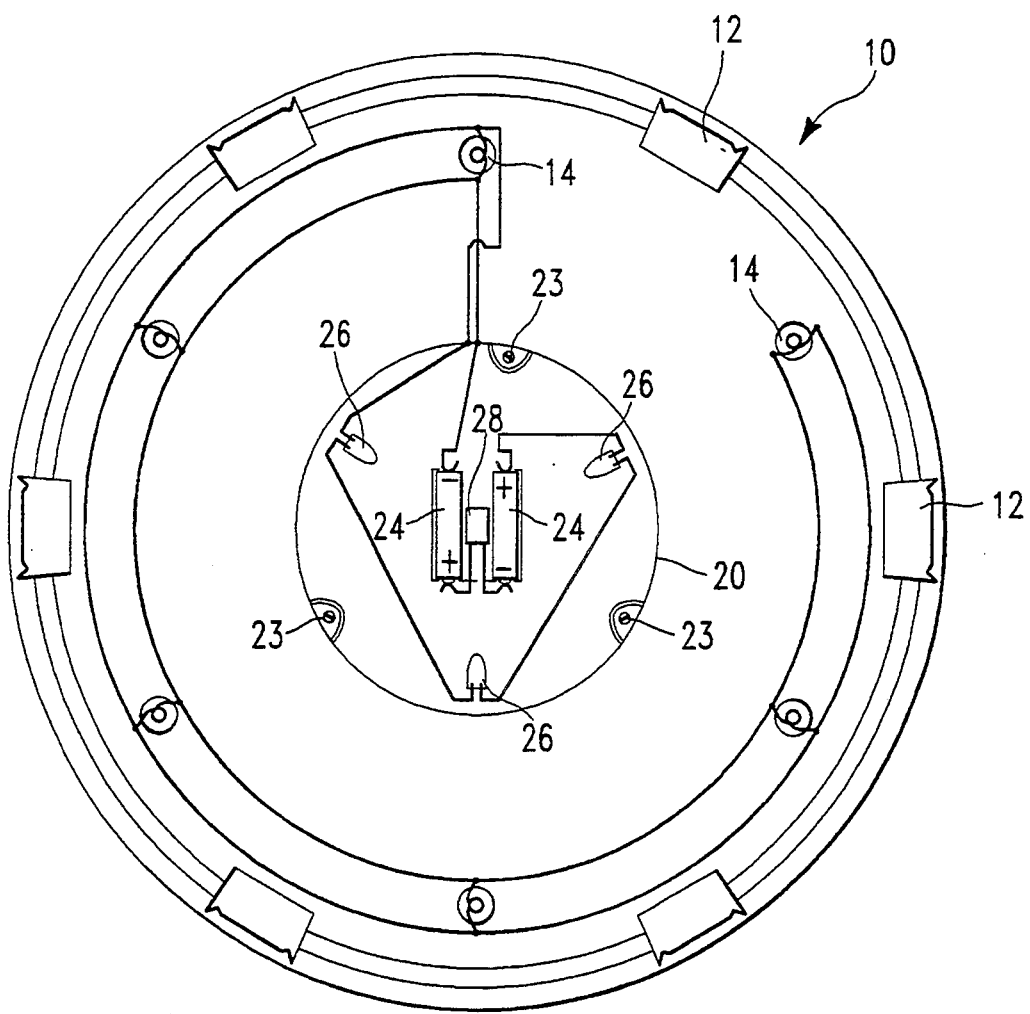
FIG. 4 is a schematic diagram of one preferred embodiment of the electrical circuit employed in the hub cap of FIGS. 1-3.

Referring to FIG. 4, the electric batteries 24, which are arranged in the enclosure 20, are mounted close to the central axis of the hub cap. Such mounting of the batteries assures that they will be subjected to a minimum of centrifugal forces during rotation of the wheel. The batteries 24 are preferably "AA" dry cell batteries; they are easily replaceable by removing the hub cap from the vehicle wheel.

As shown in FIG. 4, the batteries are connected in series and one pole of the battery pair is directly connected to each of the electric lights 14. The other pole of the battery pair 24 is connected to the electric lights through a series connection of three mercury switches 26. The mercury switches 26 are physically arranged on the hub cap in a "star" configuration such that all three switches will close only when subjected to centrifugal force. When the wheel is stationary, the liquid mercury in at least one of the switches will be drawn away from the switch contacts by gravity, thereby opening the circuit to the electric lights.

It will be understood by those skilled in the art that other, force actuated switches may be used in place of the mercury switches 26. For example, the switches may have a solid movable conductor which is affected by gravity and centrifugal force.

Mounted between the two batteries and connected in series with them is a control device 28 for switching the entire circuit on and off. The control device may be responsive to a photocell, for example, or to a receiver designed to receive and decode a special signal, such as an RF or infrared radiation signal or an ultrasound signal. In the latter case, the vehicle operator is provided with a pocket transmitter, much like a vehicle door control or a TV remote control, and he/she must then encircle the vehicle and transmit an on or off command to each hub cap. The small opening 16 at the center of the hub cap, referred to above, passes the daylight, infrared or RF radiation, or ultrasound signal to the respective control device.

Figure 5:
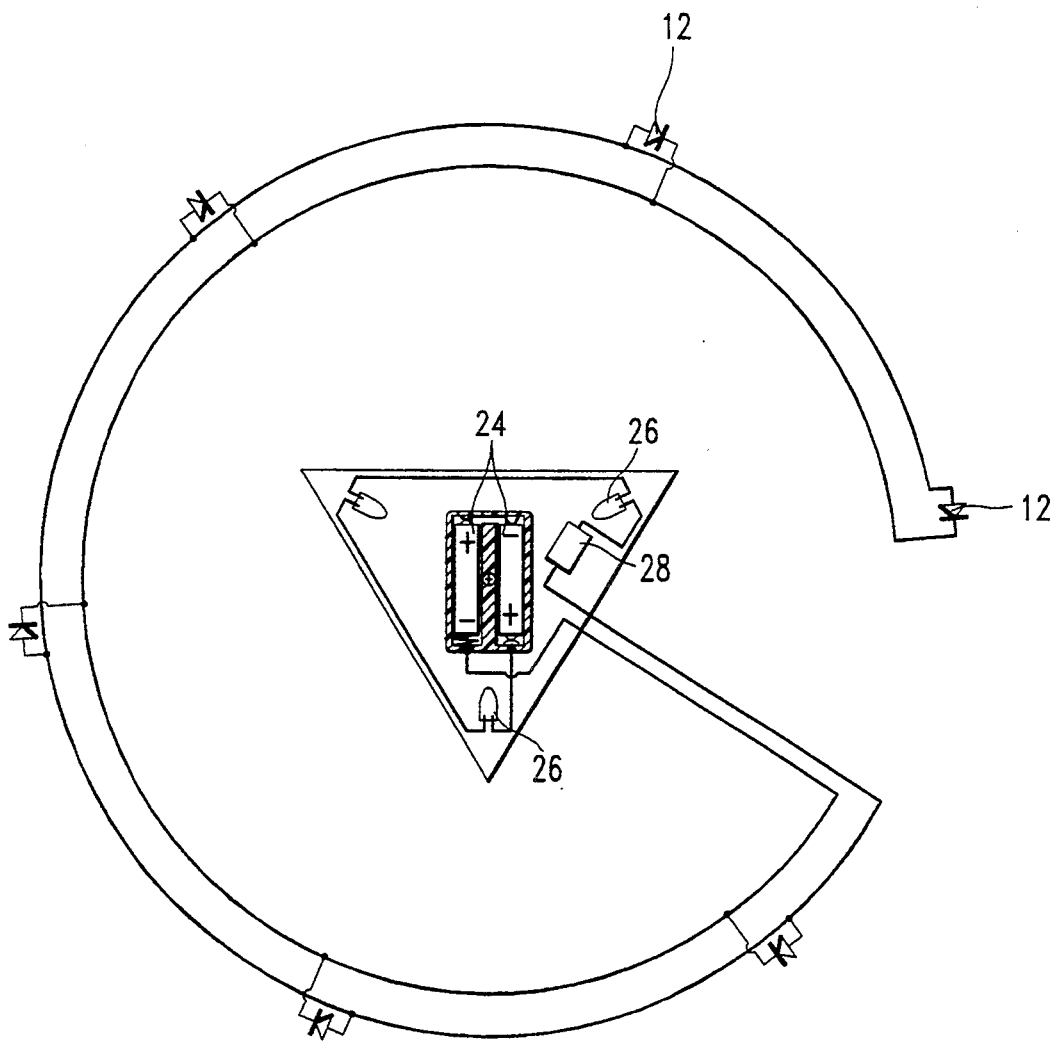
FIG. 5 is a schematic diagram of a second preferred embodiment of the electrical circuit employed in the hub cap of FIGS. 1-3.

FIG. 5 shows a circuit, similar to FIG. 4, with the exception that light emitting diodes (LED's) are used in place of incandescent light bulbs to produce the light. LED's have the advantage of requiring less battery power to operate and of having an extremely long useful life. In this circuit the control device 28 is physically mounted off to one side of the batteries.

Figure 6:
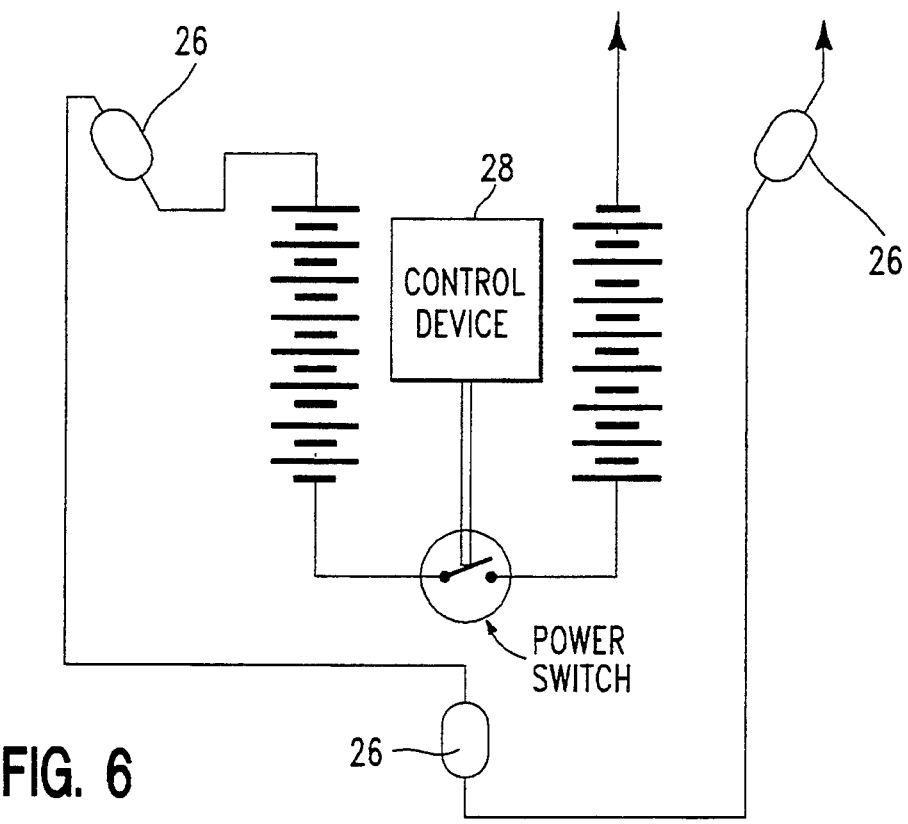
FIG. 6 is a schematic diagram of a control device for switching the electrical circuit of FIGS. 4 and 5 on and off.

FIG. 6 shows a preferred embodiment of the control device 28. As may be seen this device comprises a power transistor controlled by a photocell or a signal responsive receiver (RF or infrared radiation, ultrasound, or the like). Alternatively the power transistor may be replaced by a simple manually operated switch.

Figure 7:
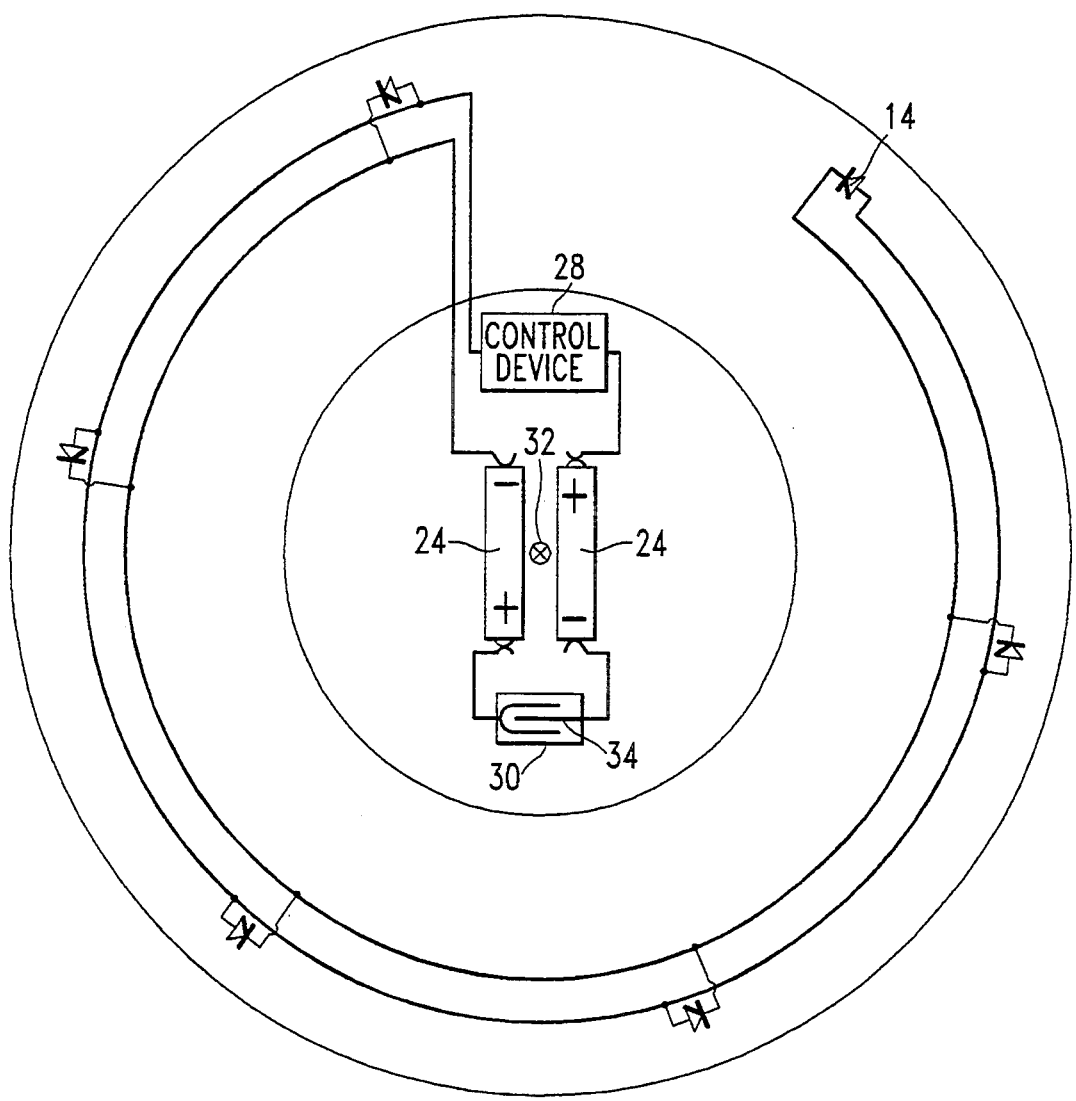
FIG. 7 is a schematic diagram of a third preferred embodiment of the electrical circuit employed in the hub cap of FIGS. 1-3.

FIG. 7 shows an alternative preferred embodiment wherein the three mercury switches are replaced by a single inertial switch 30, arranged on the hub cap at a spaced distance from the central axis 32. This inertial switch has a metal spring member 34 which closes the circuit if and only if the rotational speed of the hub cap exceeds a prescribed minimum threshold speed. For example, this minimum rotational speed may be equivalent to a vehicle speed of about 5 MPH.

Figure 8:
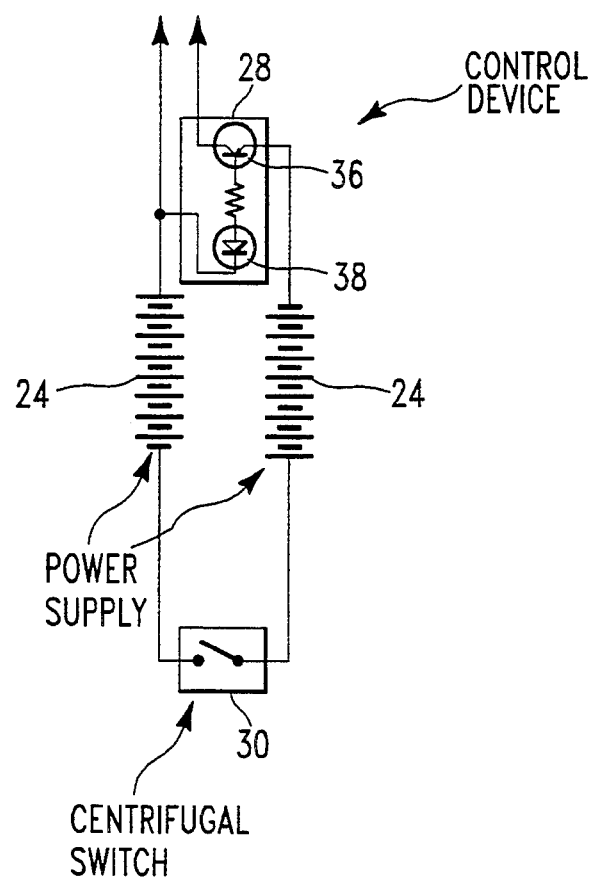
FIG. 8 is a schematic diagram of the third preferred embodiment of the electrical circuit employed in the hub cap of FIGS. 1-3, showing the control device in detail.

FIG. 8 shows a detail of the circuit of FIG. 7. As is may be seen, the control device 28 comprises a power transistor 36 controlled by a photodiode 38.

To those skilled in the art to which this invention relates, many changes in construction and widely differing embodiments and applications of the present invention will suggest themselves without departing from its spirit and scope. Thus, the disclosure herein is purely illustrative and is not intended to be in any sense limiting.

What is claimed is:

1. Circuit apparatus for providing illumination on a hub cap for a rotatable wheel, said hub cap having a central axis of rotation, said apparatus comprising:
   (a) a plurality of electric lights arranged on said hub cap;
   (b) an electric battery adapted to be arranged on said hub cap substantially at said central axis;
   (c) at least three inertial switches connected electrically in series between said battery and said electric lights and arranged on said hub cap in spaced relationship to said central axis and with such orientation as to be closed by centrifugal force upon rotation of said hub cap with said wheel, said switches being substantially circumferentially symmetrically arranged on said hub cap; and
   (d) control means connected electrically in series with the battery for switching the battery power on and off.

2. The circuit apparatus defined in claim 1, wherein said switches each include a switching element formed of a movable conductor.

3. The circuit apparatus defined in claim 1, wherein said movable conductor comprises mercury.

4. The circuit apparatus defined in claim 1, wherein said switches are normally open.

5. The circuit apparatus defined in claim 1, wherein said battery and said switches are attached to said hub cap by means of a silicone glue.

6. The circuit apparatus defined in claim 1, wherein said lights are arranged on said hub cap at substantially the same radial distance from said central axis and are substantially equally spaced in the circumferential direction.

7. The circuit apparatus defined in claim 1, wherein said control means includes a photocell which is responsive to daylight to switch off the battery power in the presence of daylight.

8. The circuit apparatus defined in claim 1, wherein said control means includes a receiver which is responsive to a transmitted signal to switch the battery power on and off.

9. The circuit apparatus defined in claim 1, wherein said control means includes a manually operated switch.

10. Circuit apparatus for providing illumination on a hub cap for a rotatable wheel, said hub cap having a central axis of rotation, said apparatus comprising:
   (a) a plurality of electric lights arranged on said hub cap;
   (b) an electric battery adapted to be arranged on said hub cap substantially at said central axis;
   (c) a single inertial switch connected electrically in series between said battery and said electric lights and arranged on said hub cap in spaced relationship to said central axis and with such orientation as to be closed by centrifugal force upon rotation of said hub cap with said wheel when said hub cap reaches a prescribed minimum rotational speed; and
   (d) control means connected electrically in series with the battery for switching the battery power on and off.

11. The circuit apparatus defined in claim 10, wherein said switch includes a switching element formed of a movable conductor.

12. The circuit apparatus defined in claim 10, wherein said movable conductor comprises a metal spring.

13. The circuit apparatus defined in claim 10, wherein said switch is normally open.

14. The circuit apparatus defined in claim 10, wherein said battery and said switch are attached to said hub cap by means of a silicone glue.

15. The circuit apparatus defined in claim 10, wherein said lights are arranged on said hub cap at substantially the same radial distance from said central axis and are substantially equally spaced in the circumferential direction.

16. The circuit apparatus defined in claim 10, wherein said control means includes a photocell which is responsive to daylight to switch off the battery power in the presence of daylight.

17. The circuit apparatus defined in claim 10, wherein said control means includes a receiver which is responsive to a transmitted signal to switch the battery power on and off.

18. The circuit apparatus defined in claim 10, wherein said control means includes a manually operated switch.

* * * * *